United States Patent [19]
Nakano et al.

[11] 4,175,266
[45] Nov. 20, 1979

[54] GROOVED DEFLECTION ELECTRODES IN AN INK JET SYSTEM PRINTER

[75] Inventors: Ichizo Nakano, Tokyo; Rikuo Takano, Musashino; Tamaki Saito, Koganei; Yuji Sumitomo, Nara; Toshio Kobayashi, Osaka; Yoichi Yamamoto, Nara, all of Japan

[73] Assignees: Nippon Telegraph and Telephone Public Corporation, Tokyo; Sharp Kabushiki Kaisha, Osaka, both of Japan

[21] Appl. No.: 684,363

[22] Filed: May 7, 1976

[30] Foreign Application Priority Data

May 13, 1975 [JP] Japan ................. 50-57860

[51] Int. Cl.² .................................. G01D 15/18
[52] U.S. Cl. ....................... 346/75; 101/DIG. 13; 400/126
[58] Field of Search ....... 197/1 R; 101/1 R, DIG. 13; 346/1 R, 75; 118/627; 239/102; 317/3; 400/126

[56] References Cited

U.S. PATENT DOCUMENTS

| | | | |
|---|---|---|---|
| 2,676,868 | 4/1954 | Jacob | 346/75 |
| 3,373,437 | 3/1968 | Sweet et al. | 346/75 |
| 3,769,627 | 10/1973 | Stone | 346/75 |
| 3,813,675 | 5/1974 | Steffy et al. | 346/75 |
| 3,893,623 | 7/1975 | Toupin | 346/75 |

FOREIGN PATENT DOCUMENTS

2324062 12/1973 Fed. Rep. of Germany ............ 346/75
43-15695 5/1968 Japan ........................................ 346/75

OTHER PUBLICATIONS

"Capacitance Sensor Arc & Contamination Shield", IBM Tech. Discl. Bull., vol. 17, No. 11, Apr., 1975, pp. 3316-3317.
"Knitted Fiber Antiink Slosher", IBM Tech. Discl. Bull., vol. 17, No. 11, Apr., 1975, p. 3318.
"Ink Jet Deflection Plate Arrangement", IBM Tech. Discl. Bull., vol. 15, No. 2, Jul., 1972, p. 476.

*Primary Examiner*—E. H. Eickholt
*Attorney, Agent, or Firm*—Birch, Stewart, Kolasch and Birch

[57] ABSTRACT

A pair of deflection electrodes at least one of which is grooved are provided to confront with each other in an ink jet system printer in order to deflect charged ink droplets emitted from a nozzle as they pass through a high voltage electric field established therebetween. Objectionable ink mist, which is unavoidably formed and diffused in various directions after the ink droplets impinge upon a recording paper or a beam gutter, attached to the grooved deflection electrode gathers and forms an ink drop, which is collected in an indent formed in the grooved deflection electrode. This precludes erroneous breaking down of the system and ensures stability of the high voltage electric field established between the pair of deflection electrodes.

12 Claims, 8 Drawing Figures

GROOVED DEFLECTION ELECTRODES IN AN INK JET SYSTEM PRINTER

BACKGROUND OF THE INVENTION

The present invention relates to deflection electrodes in an ink jet system printer.

In general, in ink jet system printers of types known in the art, charged ink droplets are emitted from a nozzle toward a recording paper. The charged ink droplets are then selectively deflected in response to signals corresponding to the information to be printed as the charged ink droplets pass through appropriate deflection means. The selectively deflected ink droplets are deposited on the recording paper in order to record desired symbols, whereas ink droplets not contributing to writing operation are conducted to a beam gutter for recirculation, as is known in the art. The ink droplets impinging upon the recording paper or the beam gutter are travelling at very high speeds. Accordingly, upon impact small particles break off from the ink droplets and diffuse in various directions. These small particles which break off from the droplets are collectively referred to as ink mist.

When the particles of ink mist attach to the deflection means and gather to form an ink drop, there is a possibility that the ink drop may cause the system to operate erroneously or break down, since the insulation of the system can not be maintained and the electric field established by the deflection means can not be stabilized.

OBJECTS AND SUMMARY OF THE INVENTION

Accordingly, an object of the present invention is to provide novel deflection means suited for precluding erroneous operation of an ink jet system printer.

Another object of the present invention is to provide a pair of deflection electrodes at least one of which is grooved for use in an ink jet system printer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a pair of deflection electrodes at least one of which is grooved are provided to confront with each other in an ink jet system printer in order to deflect charged ink droplets emitted from a nozzle as they pass through a high voltage electric field established therebetween. Particles of ink mist attached to the grooved deflection electrode gather to form an ink drop, and the ink drop is collected in an indent formed in the grooved deflection electrode. This precludes erroneous breaking down of the system and ensures stability of the high voltage electric field established between the pair of deflection electrodes.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
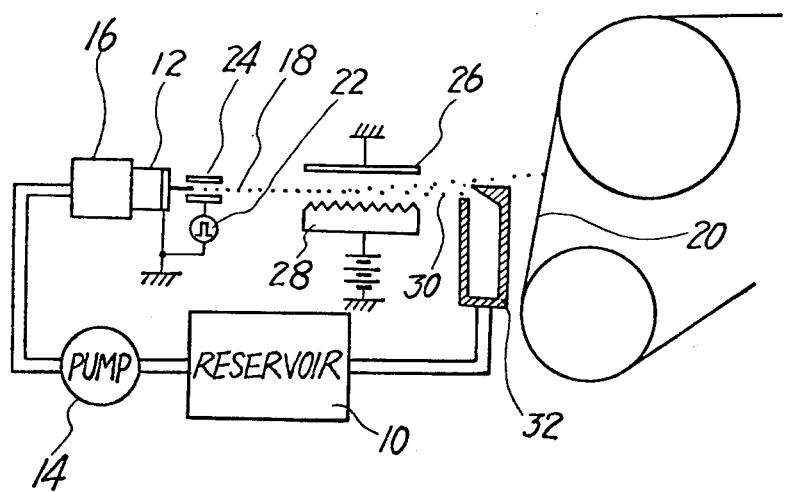
FIG. 1 is a schematic sectional view of an ink jet system printer employing an embodiment of a grooved deflection electrode of the present invention.

Referring now to the drawings, and to facilitate an understanding of the present invention, the principles of operation of an ink jet system printer of the charge amplitude controlling type will be first described with reference to FIG. 1.

Ink liquid contained within an ink reservoir 10 is sent under pressure to a nozzle 12 through a pump 14. The nozzle 12 is held by an ink droplet issuance unit including an electro-mechanical transducer 16 such as a piezo-vibrator. The ink liquid issuing from the nozzle 12 is excited by the electro-mechanical transducer 16 so that ink droplets 18 of a uniform mass and of a frequency equal to the exciting signal frequency are formed. The ink droplets 18 are directed toward a recording paper 20 at a velocity of about 20 m/sec. The individual ink droplets 18 are charged in response to printing information 22 to selected amplitudes with the use of a charging tunnel 24 in a known manner, and are deflected in accordance with the amplitude of charges on the droplets as they pass over a high-voltage electric field established by a pair of high-voltage deflection electrodes 26 and 28. The droplets are then deposited on the recording paper 20 in order to record a desired symbol. Ink droplets 30, not contributive to writing operation, are directed to a beam gutter 32 in order to recirculate waste ink liquid to the ink reservoir 10.

Figure 2:
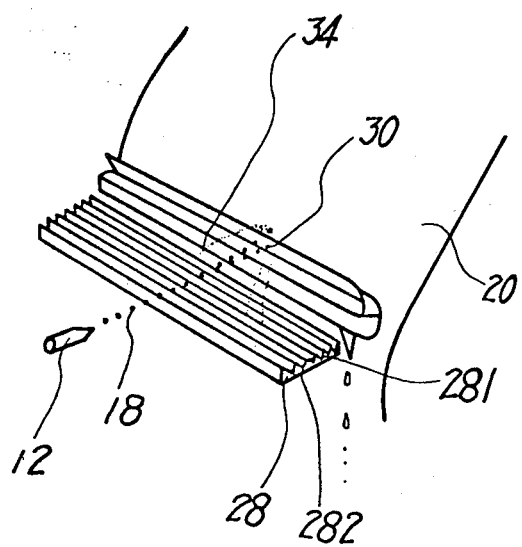
FIG. 2 is a perspective view of an embodiment of a grooved deflection electrode of the present invention.
Figure 3:
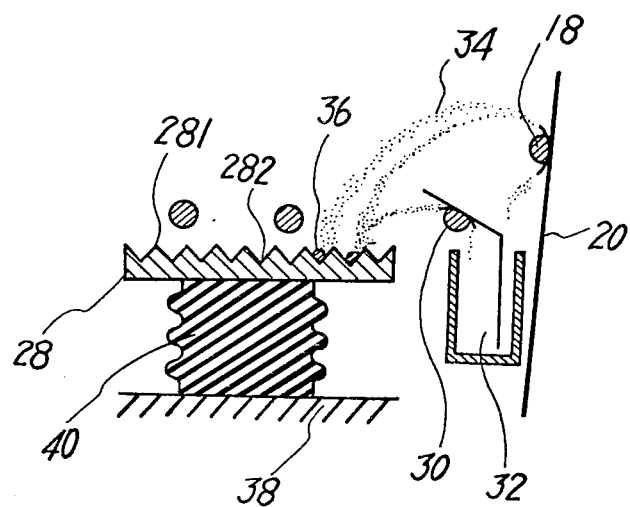
FIG. 3 is a sectional view of the grooved deflection electrode of FIG. 2.

Since the ink droplets 18 are emitted from the nozzle 12 at a velocity of 20 m/sec, after the ink droplets 18 and 30 impinge upon the recording paper 20 and the beam gutter 32, a part of the ink droplets is broken into particles 34 of ink mist which are diffused in various directions as shown in FIGS. 2 and 3. When such particles 34 of ink mist attach to the high-voltage deflection electrodes 26 and 28, there is a possibility that the system is erroneously broken down or the high-voltage electric field established by the pair of high-voltage deflection electrodes 26 and 28 is undesirably influenced, because the particles 34 of ink mist gather to form an ink drop. The deflection electrode 28 is usually supplied with a high voltage of about 3–6 KV and, therefore, the insulation thereof must be strictly maintained.

FIG. 2 shows the deflection electrode 28 of the present invention in detail. FIG. 3 is a sectional view of the deflection electrode 28.

A plurality of grooves 281 are formed on the surface of the deflection electrode 28. The particles 34 of ink mist attached to the deflection electrode 28 gather to form an ink drop 36, which is collected in indents 282 formed on the surface of the deflection electrode 28. Therefore, the high-voltage leak will not occur and, moreover, the ink drop 36 will not disturb the high-voltage electric field established between the deflection electrodes 26 and 28. The particles 34 of ink mist attached to the deflection electrode 28 can easily evaporate and, therefore, the occurrence of the ink drop 36 is of a low possibility, since the surface of the deflection electrode 28 has large area because of provision of the grooves 281. The deflection electrode 28 is disposed on a supporting bed 38 via an insulating supporter 40.

A large part of undesirable dust such as thread drifting in the air can be captured in the indents 282 and, therefore, the printing distortion caused by the dust can be substantially eliminated.

Figure 4:
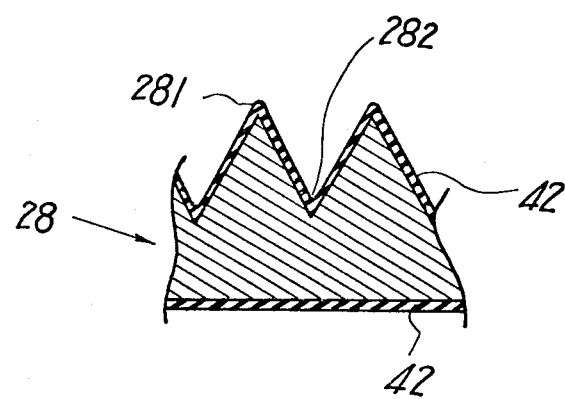
FIG. 4 is a sectional view showing part of another embodiment of a grooved deflection electrode of the present invention.

FIG. 4 shows another embodiment of the grooved deflection electrode 28, wherein the surface of the grooved deflection electrode 28 is coated with insulating material 42 such as teflon or coated with alumite for preventing the discharge from the deflection electrode 28.

FIGS. 5 through 8 show other embodiments of the deflection electrode of the present invention.

Figure 5:
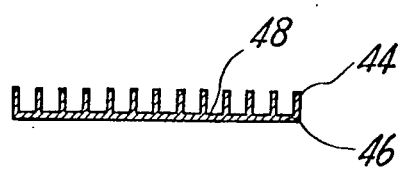
FIG. 5 is a sectional view of still another embodiment of a grooved deflection electrode of the present invention.
Figure 6:
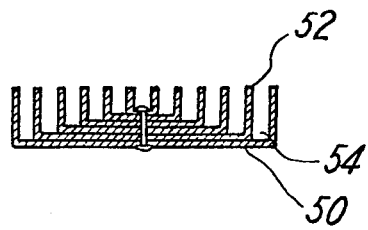
FIG. 6 is a sectional view of yet another embodiment of a grooved deflection electrode of the present invention.

A plurality of fins 44 are transversely formed on a metal plate 46 in the FIG. 5 embodiment. The indent portions 48 function to retain the ink drops formed by the particles of ink mist attached to the fins 44. A plurality of metal plates 50, both ends of which are bent to form fins 52, are stacked in the FIG. 6 embodiments. The indents 54 retain the ink drops made of the particles of ink mist attached to the fins 52.

Figure 7:
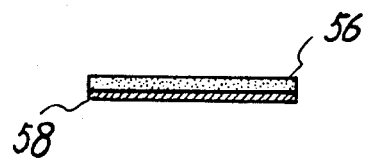
FIG. 7 is a sectional view of a further embodiment of a grooved deflection electrode of the present invention.
Figure 8:
FIG. 8 is a sectional view of a still further embodiment of a grooved deflection electrode of the present invention.

A hygroscopic cloth 56 or porous material is attached to a metal plate 58 in the FIG. 7 embodiment, whereas, in the FIG. 8 embodiment, the deflection electrode is made of a porous metal 60.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In combination with an ink jet system printer which emits charged ink droplets from a nozzle toward a recording paper in a path of travel and selectively deflects said ink droplets by deflection means and records desired symbols on said recording paper with said selectively deflected ink droplets, said droplets on impact with said recording paper emitting ink mist which rebounds toward said deflection means and tends to accumulate thereon, said deflection means comprising:
   a pair of deflection electrodes having opposed surfaces;
   a high-voltage source to establish a high-voltage electric field between the pair of deflection electrodes; and
   groove means defined in the surface of at least one of said electrodes transversely of said path of travel for constraining ink mist impinged thereon to collect in said groove means away from said surface to preclude disturbance of said electric field by accumulations of ink.

2. The combination of claim 1, wherein the pair of deflection electrodes are made of
   a plate electrode maintained at the ground potential; and
   a grooved electrode connected to the high-voltage source.

3. The combination of claim 1, wherein the surface of the grooved deflection electrode is coated with an insulating film.

4. In combination with an ink jet system printer which emits charged ink droplets from a nozzle toward a recording paper in a path of travel and selectively deflects said ink droplets by deflection means and records desired symbols on said recording paper with said selectively deflected ink droplets, said droplets on impact with said recording paper emitting ink mist which rebounds toward said deflection means and tends to accumulate thereon, said deflection means comprising:
   a pair of deflection electrodes having opposed surfaces;
   a high-voltage source to establish a high-voltage electric field between the pair of deflection electrodes; and
   a plurality of outwardly projecting fin means defining a grooved surface on at least one of said electrodes for constraining ink mist impinged thereon to collect in the grooves defined by said fins away from said surface defined thereby to preclude disturbance of said substantially constant value electric field by accumulations of ink.

5. The combination of claim 4, wherein the pair of deflection electrodes are made of
   a plate electrode maintained at the ground potential; and
   a finned electrode connected to the high-voltage source.

6. The invention of claim 4, wherein the fins are transversely formed on the deflection electrode with reference to the path of travel of said ink droplets.

7. For use in an ink jet system printer of the charge amplitude controlling type wherein an ink stream emitted from a nozzle having an ultrasonic vibrator is broken into ink droplets at a given vibration frequency, and the individual ink droplets, charged by a charging tunnel in accordance with a video signal, are deflected in their path of travel in accordance with the amplitude of charges carried thereon as they pass through a high-voltage electric field established by a pair of opposed deflection electrodes, thereby printing desired symbols on a recording medium, and wherein impact of said ink droplets with said medium results in an ink mist tending to accumulate on at least one of said deflection plates and disturb said electric field, the improvement comprising:
   said pair of deflection electrodes having a respective pair of opposed surfaces;
   a high-voltage source to establish the high-voltage electric field between the pair of deflection electrodes; and
   groove means defined in the surface of at least one of said electrodes transversely of said path of travel of said ink drops for constraining ink mist impinged thereon to collect in said groove means away from said surface to preclude disturbance of said electric field by accumulations of ink.

8. The improvement of claim 7, wherein the high-voltage electric field is established in the vertical direction, and wherein the pair of deflection electrodes are made of an upper plate electrode maintained at the ground potential and a lower grooved electrode connected to the high-voltage source.

9. The improvement of claim 7, wherein the surface of the grooved deflection electrode is coated with an insulating film.

10. For use in an ink jet system printer of the charge amplitude controlling type wherein an ink stream emitted from a nozzle having an ultrasonic vibrator is broken into ink droplets at a given vibration frequency, and the individual ink droplets, charged by a charging tunnel in accordance with printing information, are deflected in their path of travel in accordance with the amplitude of charges carried thereon as they pass through a high-voltage electric field established by a pair of opposed deflection electrodes, thereby printing desired symbols on a recording medium, and wherein impact of said ink droplets with said medium results in an ink mist tending to accumulate on at least one of said deflection plates and disturb said electric field, the improvement comprising:

said pair of deflection electrodes having a respective pair of opposed surfaces;

a high-voltage source to establish a high-voltage electric field between the pair of deflection electrodes; and a plurality of outwardly projecting fin means defining a grooved surface on at least one of said electrodes for constraining ink mist impinged thereon to collect in the grooves defined by said fins away from said surface defined thereby to preclude disturbance of said electric field by accumulations of ink.

11. The improvement of claim 10, wherein the pair of deflection electrodes are made of an upper plate electrode maintained at the ground potential and a lower finned electrode connected to the high-voltage source, the high-voltage electric field being established therebetween.

12. The improvement of claim 10, wherein the fins are transversely formed on the deflection electrode with reference to the path of travel of said ink droplets.

* * * * *